United States Patent
Xie et al.

(10) Patent No.: US 10,223,183 B2
(45) Date of Patent: Mar. 5, 2019

(54) RAPID FAULT DETECTION METHOD AND DEVICE

(71) Applicant: Huawei Technologies Co., Ltd., Shenzhen (CN)

(72) Inventors: Junyong Xie, Shenzhen (CN); Tao Liu, Shenzhen (CN); Hai Xia, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 179 days.

(21) Appl. No.: 15/136,690

(22) Filed: Apr. 22, 2016

(65) Prior Publication Data

US 2016/0239369 A1    Aug. 18, 2016

Related U.S. Application Data

(63) Continuation of application No. PCT/CN2014/089421, filed on Oct. 24, 2014.

(30) Foreign Application Priority Data

Oct. 24, 2013 (CN) .......................... 2013 1 0507154

(51) Int. Cl.
  *G06F 11/00* (2006.01)
  *G06F 11/07* (2006.01)
  *G06F 9/455* (2018.01)

(52) U.S. Cl.
  CPC ...... *G06F 11/0721* (2013.01); *G06F 9/45558* (2013.01); *G06F 11/0712* (2013.01); *G06F 11/0772* (2013.01); *G06F 11/0793* (2013.01); *G06F 2009/45591* (2013.01)

(58) Field of Classification Search
  CPC ............. G06F 11/0712; G06F 11/0772; G06F 11/0784; G06F 11/0793; G06F 9/45558; G06F 2009/45591
  See application file for complete search history.

(56) References Cited

U.S. PATENT DOCUMENTS

| | | | |
|---|---|---|---|
| 8,839,032 B2 * | 9/2014 | Walton ................ | G06F 11/0712 709/224 |
| 9,483,368 B2 * | 11/2016 | Yang ................... | G06F 9/45558 |
| 2008/0162983 A1 | 7/2008 | Baba et al. | |

(Continued)

FOREIGN PATENT DOCUMENTS

| CN | 101593128 A | 12/2009 |
|---|---|---|
| CN | 101833497 A | 9/2010 |

(Continued)

*Primary Examiner* — Marc Duncan
(74) *Attorney, Agent, or Firm* — Leydig, Voit & Mayer, Ltd.

(57) ABSTRACT

A method for quickly detecting a fault includes: detecting, by a Kernel Black Box KBox set, a fault occurred in an operation system; and generating, by the KBox set, fault information based on the detected fault; and transmitting, by the KBox set, system fault notification information including the fault information to an application high availability HA subsystem via a management unit of an infrastructure layer, to trigger a service fault processing of the application HA subsystem. Thus, the fault or unhealthiness of an OS is detected rapidly and a service application layer is timely notified to process the fault, thus reducing service loss.

6 Claims, 4 Drawing Sheets

(56) References Cited

U.S. PATENT DOCUMENTS

2011/0029568 A1     2/2011   Muraki et al.
2013/0275805 A1*   10/2013   Harper ................ G06F 11/1438
                                                          714/16
2014/0006877 A1*    1/2014   Zhu ..................... G06F 11/3466
                                                          714/45

FOREIGN PATENT DOCUMENTS

| CN | 102364448 A | 2/2012 |
| CN | 103559124 A | 2/2014 |
| WO | WO 2011051025 A1 | 5/2011 |

* cited by examiner

RAPID FAULT DETECTION METHOD AND DEVICE

CROSS-REFERENCE TO RELATED APPLICATIONS

This application is a continuation of International Patent Application No. PCT/CN2014/089421, filed on Oct. 24, 2014, which claims priority to Chinese Patent Application No. 201310507154.5, filed on Oct. 24, 2013, both of which are hereby incorporated by reference in their entireties.

FIELD

The present application relates to the field of communication technology, and in particular to a method and device for quickly detecting a fault.

BACKGROUND

A telecommunication system is divided into an infrastructure layer and a service application layer in the cloud technology. The infrastructure layer provides resources to the service application layer using a virtualization technology. The service application layer is operated on a host operation system (Host OS) and a guest operation system (Guest OS). The operation system (OS) as an execution environment supports an operation of the service application layer, and supply of a service will be influenced if a fault or a sub-health problem occurs in the execution environment.

In the conventional telecommunication system, a fault of the execution environment is generally detected by a heart beat (HB) detection. That is, a heart beat program is run on the Host OS and the Guest OS each, and transmits a heart beat message to a high availability (HA) subsystem periodically. Once a fault occurs in the Host OS or the Guest OS, the heart beat message can not be transmitted. The HA subsystem may determine that a fault occurs in the host machine or a virtual machine, in the case that no heart beat message is received in multiple detecting periods.

In practice, in a case of a long detecting period, the HA subsystem can not detect the fault occurred in the Host OS or the Guest OS in a timely manner, and thereby resulting in deterioration of service availability. In a case of a short detecting period, the HA subsystem may misjudge that a fault occurs in the Host OS or the Guest OS once a communication delay occurs in a network.

SUMMARY

A method and device for quickly detecting a fault are provided according to embodiments of the present application, which are used to quickly detect a fault or a sub-health problem occurred in an operation system.

In a first aspect, a method for quickly detecting a fault is provided according to an embodiment of the present application, which includes:

detecting, by a Kernel Black box KBox set, a fault occurred in an operation system; and generating, by the KBox set, fault information based on the detected fault; and transmitting, by the KBox set, system fault notification information including the fault information to an application high availability HA subsystem via a management unit of an infrastructure layer, to trigger a service fault processing of the application HA subsystem.

In a first possible implementation of the first aspect, the detecting, by a KBox set, a fault occurred in an operation system may include:

determining, by the KBox set, an unexpected resetting of the operation system based on an execution flow detected by a probe used for a resetting process of the operation system, in a process of detecting the unexpected resetting of the operation system;

determining, by the KBox set, a memory exhaustion of the operation system in a case that a probe used for a memory resource distributing process of the operation system detects that a memory of the operation system is less than or equal to a preset threshold or the probe detects that a memory of the operation system is less than or equal to a preset threshold in a preset period, in a process of detecting the memory exhaustion of the operation system;

determining, by the KBox set, that the kernel of the operation system is locked up in a case that a probe arranged at a central processing unit CPU and used for detecting an operation state detects that the CPU is in a deadlock state, in a process of detecting the lockup of the kernel of the operation system;

determining, by the KBox set, a kernel crash of the operation system based on an execution flow detected by a probe used for a kernel crash processing process of the operation system, in a process of detecting the kernel crash of the operation system;

determining, by the KBox set, a fault of the CPU based on an interruption and fault reason transmitted by a probe which is arranged in the operation system and used for detecting a hardware fault interruption of the CPU, in a process of detecting a hardware fault of the CPU; and determining, by the KBox set, that a virtual machine is to be reset in a case that the KBox set detects a reset interruption of the virtual machine transmitted on the infrastructure layer, in a process of detecting a resetting of the virtual machine.

In conjunction with the first aspect or the first possible implementation of the first aspect, in a second possible implementation, the detecting, by a KBox set, a fault occurred in an operation system; and generating, by the KBox set, fault information based on the detected fault may include:

detecting, by a first KBox of the KBox set, a fault occurred in a guest operation system and generating, by the first KBox, first fault information based on the detected fault, where the first KBox is provided in a virtual machine, and the first fault information includes a fault reason, a fault description, a fault occurrence time and a virtual machine identifier corresponding to the fault; and where the management unit is an infrastructure management unit IMU provided in a host operation system, and the transmitting, by the KBox set, system fault notification information including the fault information to an application high availability HA subsystem via a management unit of the infrastructure layer to trigger a service fault processing of the application HA subsystem may include:

transmitting, by the first KBox, the first fault information to the IMU, where the IMU transmits first system fault notification information to an application HA subsystem corresponding to the virtual machine, to trigger the service fault processing of the application HA subsystem, where the first system fault notification information includes the first fault information and the virtual machine identifier corresponding to the first KBox.

In conjunction with the first aspect or the first possible implementation of the first aspect, in a third possible implementation, the detecting, by a KBox set, a fault occurred in an operation system; and generating, by the KBox set, fault information based on the detected fault may include:

detecting, by a second KBox of the KBox set, a fault occurred in a host operation system and generating, by the second KBox, second fault information based on the detected fault, where the second KBox is provided in the host operation system and the second fault information includes a fault reason, a fault description and a fault occurrence time; and where the management unit is a board management controller BMC implemented in hardware, and the transmitting, by the KBox set, system fault notification information including the fault information to an application high availability HA subsystem via a management unit of an infrastructure layer to trigger the service fault processing of the application HA subsystem may include:

transmitting, by the second KBox, the second fault information to the BMC, where the BMC transmits second system fault notification information including the second fault information to an application HA subsystem corresponding to at least one virtual machine, to trigger the service fault processing of the application HA subsystem, and the at least one virtual machine is established on the host operation system.

In conjunction with the first aspect to the third possible implementation of the first aspect, in a fourth possible implementation, the method may further include:

transmitting, by the KBox set, the fault information to an infrastructure HA subsystem via the management unit of the infrastructure layer, where the infrastructure HA subsystem transmits the system fault notification information including the fault information to the application HA subsystem.

In a second aspect, a method for quickly detecting a fault is provided according to an embodiment of the present application, which includes:

receiving, by an application high availability HA subsystem, system fault notification information including fault information from a Kernel Black Box KBox set via a management unit of an infrastructure layer; and triggering, by the application HA subsystem, a service fault processing of the application HA subsystem based on the system fault notification information.

In a first possible implementation of the second aspect, the management unit may be an infrastructure management unit IMU provided in a host operation system, and where the receiving, by an application HA subsystem, system fault notification information including fault information from a KBox set via a management unit of an infrastructure layer may include:

receiving, by the application HA subsystem, first system fault notification information from the IMU, where the first system fault notification information includes first fault information and a virtual machine identifier corresponding to a first KBox of the KBox set, where the first KBox is provided in a virtual machine, and the first fault information includes a fault reason, a fault description, a fault occurrence time and a virtual machine identifier corresponding to the fault; and the triggering, by the application HA subsystem, a service fault processing of the application HA subsystem based on the system fault notification information may include:

triggering, by the application HA subsystem, the service fault processing of the application HA subsystem based on the first system fault notification information.

In a second possible implementation of the second aspect, the management unit may be a board management controller BMC implemented in a hardware; and where the receiving, by an application HA subsystem, system fault notification information including fault information transmitted from a KBox set via a management unit of an infrastructure layer may include:

receiving, by the application HA subsystem, second system fault notification information from a second KBox of the KBox set via the BMC, where the second system fault notification information includes second fault information, where the second KBox is provided in the host operation system, and the second fault information includes a fault reason, a fault description and a fault occurrence time; and the triggering, by the application HA subsystem, a service fault processing of the application HA subsystem based on the system fault notification information may include:

triggering, by the application HA subsystem, the service fault processing of the application HA subsystem based on the second system fault notification information.

In conjunction with the second aspect to the second possible implementation of the second aspect, in a third possible implementation, the method may further include:

receiving, by the application HA subsystem, the system fault notification information including the fault information from the infrastructure HA subsystem, where the infrastructure HA subsystem transmits the system fault notification information after receiving the fault information from the KBox set via the management unit of the infrastructure layer.

In a third aspect, a device for quickly detecting a fault is provided according to an embodiment of the present application, which includes:

a detecting module configured to detect a fault occurred in an operation system and generate fault information based on the detected fault by a Kernel Black Box KBox set; and a transmitting module configured to transmit system fault notification information including the fault information to an application high availability HA subsystem by the KBox set via a management unit of an infrastructure layer, to trigger a service fault processing of the application HA subsystem.

In a first possible implementation of the third aspect, the detecting module may be configured to:

determine, by the KBox set, an unexpected resetting of the operation system based on an execution flow detected by a probe used for a resetting process of the operation system, in a process of detecting the unexpected resetting of the operation system;

determine, by the KBox set, a memory exhaustion of the operation system in a case that a probe used for a memory resource distributing process of the operation system detects that a memory of the operation system is less than or equal to a preset threshold or the probe detects that a memory of the operation system is less than or equal to a preset threshold in a preset period, in a process of detecting the memory exhaustion of the operation system;

determine, by the KBox set, that a kernel of the operation system is locked up in a case that a probe, arranged at a central processing unit CPU and used for detecting an operation state, detects that the CPU is in a deadlock state, in a process of detecting the lockup of the kernel of the operation system;

determine, by the KBox set, the kernel crash of the operation system based on an execution flow detected by a probe used for a kernel crash processing process of the operation system, in a process of detecting the kernel crash of the operation system;

determine, by the KBox set, a fault of the CPU based on an interruption and fault reason transmitted by a probe which is arranged in the operation system and used for detecting a hardware fault interruption of the CPU, in a process of detecting a hardware fault of the CPU; and determine, by the KBox set, that the virtual machine is to be reset in a case that the KBox set detects a reset interruption of the virtual machine transmitted on the infrastructure layer, in a process of detecting a resetting of a virtual machine.

In conjunction with the third aspect or the first possible implementation of the third aspect, in a second possible implementation, the detecting module may be configured to:

detect, by a first KBox of the KBox set, a fault occurred in a guest operation system and generate first fault information based on the detected fault, where the first KBox is provided in a virtual machine, and the first fault information includes a fault reason, a fault description, a fault occurrence time and a virtual machine identifier corresponding to the fault; and where the management unit is an infrastructure management unit IMU provided in a host operation system, and the transmitting module is further configured to:

transmit, by the first KBox, the first fault information to the IMU, where the IMU transmits first system fault notification information to an application HA subsystem corresponding to the virtual machine, to trigger the service fault processing of the application HA subsystem, where the first system fault notification information includes the first fault information and a virtual machine identifier corresponding to the first KBox.

In conjunction with the third aspect or the first possible implementation of the third aspect, in a third possible implementation, the detecting module is further configured to:

detect, by a second KBox of the KBox set, a fault occurred in a host operation system and generate second fault information based on the detected fault, where the second KBox is provided in the host operation system and the second fault information includes a fault reason, a fault description and a fault occurrence time; and where the management unit is a board management controller BMC implemented in hardware, and the transmitting module is further configured to:

transmit, by the second KBox, the second fault information to the BMC, where the BMC transmits second system fault notification information including the second fault information to an application HA subsystem corresponding to at least one virtual machine, to trigger the service fault processing of the application HA subsystem, and the at least one virtual machine is established on the host operation system.

In conjunction with the third aspect to the third possible implementation of the third aspect, in a fourth possible implementation, the transmitting module is further configured to:

transmit, by the KBox set, the fault information to an infrastructure HA subsystem via the management unit of the infrastructure layer, where the infrastructure HA subsystem transmits the system fault notification information including the fault information to the application HA subsystem.

In a fourth aspect, a device for quickly detecting a fault is provided according to an embodiment of the present application, which includes:

a receiving module configured to receive system fault notification information including fault information from a Kernel Black Box KBox set via a management unit of an infrastructure layer; and a transmitting module configured to trigger a service fault processing of an application HA subsystem based on the system fault notification information.

In a first possible implementation of the fourth aspect, the management unit may be an infrastructure management unit IMU provided in a host operation system; and where the receiving module is further configured to:

receive first system fault notification information from the IMU, where the first system fault notification information includes first fault information and a virtual machine identifier corresponding to a first KBox of the KBox set, the first KBox is provided in a virtual machine, and the first fault information includes a fault reason, a fault description, a fault occurrence time and a virtual machine identifier corresponding to the fault; and the transmitting module is further configured to:

trigger the service fault processing of the application HA subsystem based on the first system fault notification information.

In a second implementation of the fourth aspect, the management unit may be a board management controller BMC implemented in a hardware; and where the receiving module is further configured to:

receive second system fault notification information from a second KBox of the KBox set via the BMC, where the second system fault notification information includes second fault information, where the second KBox is provided in the host operation system, and the second fault information includes a fault reason, a fault description and a fault occurrence time; and the transmitting module is further configured to:

trigger the service fault processing of the application HA subsystem based on the second system fault notification information.

In conjunction with the fourth aspect to the second possible implementation of the fourth aspect, in a third possible implementation, the receiving module is further configured to:

receive the system fault notification information including the fault information from the infrastructure HA subsystem, where the infrastructure HA subsystem transmits the system fault notification information, after receiving the fault information from the KBox set via the management unit of the infrastructure layer.

With the method and device for quickly detecting a fault according to the embodiments of the present application, a Kernel Black Box KBox set detects a fault occurred in the operation system and generates fault information based on the detected fault; and the KBox set transmits system fault notification information including the fault information to an application high availability HA subsystem via a management unit of an infrastructure layer, to trigger a service fault processing of the application HA subsystem. In this way, a fault or sub-heath problem occurred in the operation system may be detected quickly and a service application layer is notified to process the fault in a timely manner to reduce the service loss.

BRIEF DESCRIPTION OF THE DRAWINGS

In order to describe technical solutions in embodiments of the present application or the conventional technology more clearly, hereinafter drawings to be used in the description of the embodiments or the conventional technology are introduced simply. Apparently, the drawings described below only describe some embodiments of the present application. Those skilled in the art may obtain other drawings based on these drawings without any creative work.

DETAILED DESCRIPTION OF EMBODIMENTS

In order to make objects, technical solutions and advantages of embodiments of the present application more clearly, hereinafter technical solutions of embodiments of the present application are described clearly and completely in conjunction with the drawings of the embodiments of the present application. Apparently, the described embodiments are some rather all of the embodiments of the present application. Any other embodiments obtained based on the embodiments of the present application by those skilled in the art without any creative work fall within the scope of protection of the present application.

Figure 1:
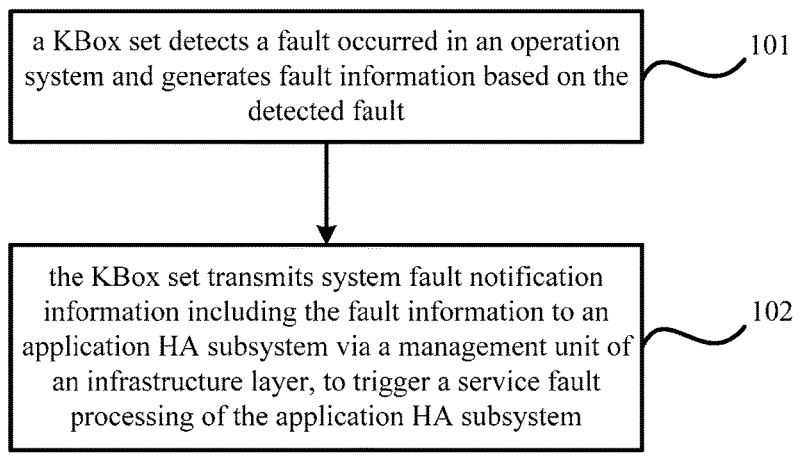
FIG. 1 is a flowchart of a first embodiment of a method for quickly detecting a fault according to the present application.

FIG. 1 is a flowchart of a first embodiment of a method for quickly detecting a fault according to the present application. As shown in FIG. 1, the method according to the embodiment may include the following.

In step S101, a kernel black box (KBox) set detects a fault occurred in an operation system and generates fault information based on the detected fault.

It should be noted that, the fault or sub-health problem occurred in the operation system may include: an unexpected reset of the operation system, memory exhaustion of the operation system, kernel lockup of the operation system, kernel crash of the operation system, a hardware fault of a CPU and a reset of a virtual machine. Specifically, the KBox set detecting a fault occurred in the operation system may include:

determining, by the KBox set, an unexpected resetting of the operation system based on an execution flow detected by a probe used for a resetting process of the operation system, in a process of detecting the unexpected resetting of the operation system; determining, by the KBox set, a memory exhaustion of the operation system in a case that a probe used for a memory resource distributing process of the operation system detects that a memory of the operation system is less than or equal to a preset threshold or the probe detects that a memory of the operation system is less than or equal to a preset threshold in a preset period, in a process of detecting the memory exhaustion; determining, by the KBox set, that the kernel of the operation system is locked up in a case that a probe arranged at a central processing unit (CPU) and used for detecting an operation state detects that the CPU is in a deadlock state, in a process of detecting the lockup of the kernel of the operation system; determining, by the KBox set, the kernel crash of the operation system based on an execution flow detected by a probe used for a kernel crash processing flow of the operation system, in a process of detecting the kernel crash of the operation system; determining, by the KBox set, the fault of the CPU based on an interruption and fault reason transmitted by a probe arranged in the operation system and used for detecting a hardware fault interruption of the CPU, in a process of detecting a hardware fault of the CPU; and determining that the virtual machine is to be reset in a case that the KBox set detects a reset interruption of the virtual machine transmitted on the infrastructure layer, in a process of detecting a resetting of a virtual machine.

In step 102, the KBox set transmits system fault notification information including the fault information to an application HA subsystem via a management unit of an infrastructure layer, to trigger a service fault processing of the application HA subsystem.

It should be noted that, in some possible implementations, the KBox set may also transmit the fault information to the infrastructure HA subsystem via the management unit of the infrastructure layer. Then, the infrastructure HA subsystem transmits the system fault notification information including the fault information to the application HA subsystem.

With the method and device for quickly detecting a fault according to the embodiments of the present application, a KBox set detects a fault occurred in the operation system and generates fault information based on the detected fault; and the KBox set transmits system fault notification information including the fault information to an application HA subsystem via a management unit of an infrastructure layer, to trigger a service fault processing of the application HA subsystem. In this way, a fault or sub-heath problem occurred in the operation system may be detected quickly and a service application layer is notified to process the fault in a timely manner to reduce the service loss.

Figure 2:
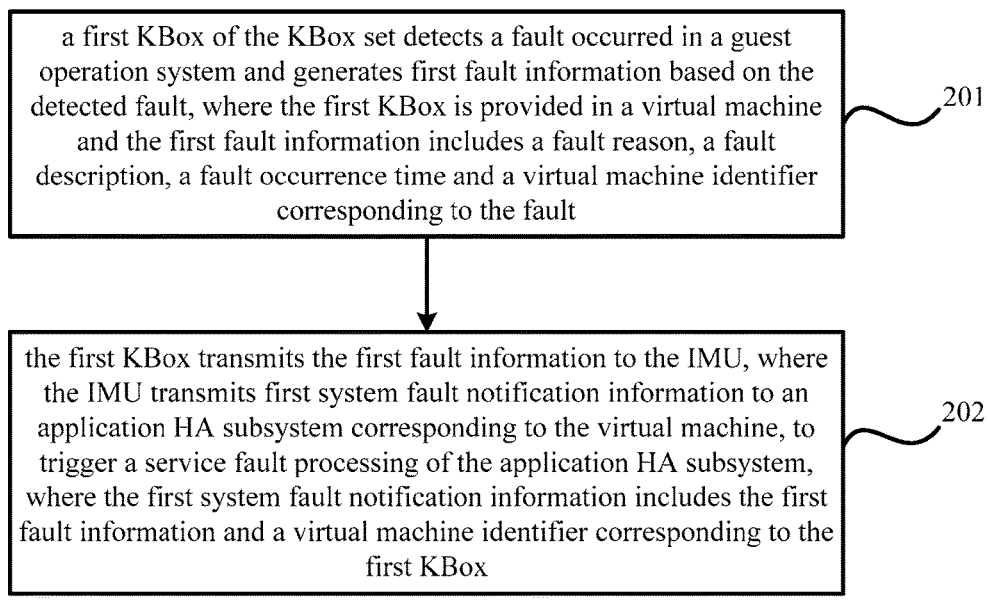
FIG. 2 is a flowchart of a second embodiment of a method for quickly detecting a fault according to the present application.

FIG. 2 is a flowchart of a second embodiment of the method for quickly detecting a fault according to the present application. As shown in FIG. 2, based on the above embodiment, in the method according to the embodiment, step 101 may include step 201.

In step 201, a first KBox of the KBox set detects a fault occurred in a guest operation system and generates first fault information based on the detected fault, where the first KBox is provided in a virtual machine, and the first fault information includes a fault reason, a fault description, a fault occurrence time and a virtual machine identifier corresponding to the fault.

In the embodiment, the management unit of the infrastructure layer may be an infrastructure management unit (IMU) in a host operation system of the infrastructure layer. Accordingly, step 102 may include step 202.

In step 202, the first KBox transmits the first fault information to the IMU, such that the IMU transmits first system fault notification information to an application HA subsystem corresponding to the virtual machine, to trigger a service fault processing of the application HA subsystem, where the first system fault notification information includes the first fault information and a virtual machine identifier corresponding to the first KBox.

Figure 3:
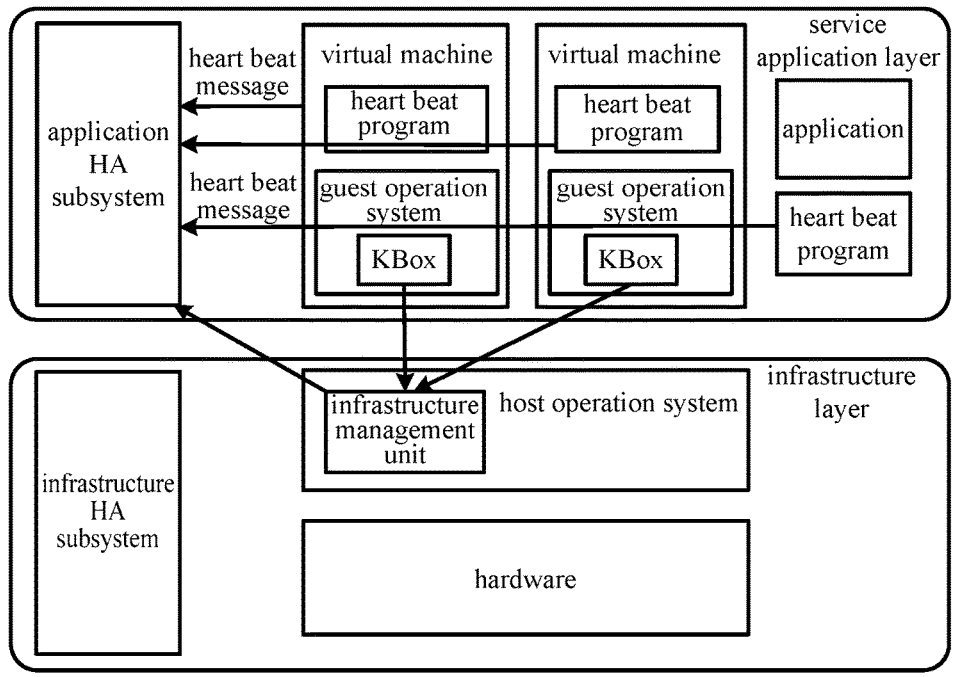
FIG. 3 is a schematic diagram of an application of the second embodiment of the method for quickly detecting the fault according to the present application.

Referring to FIG. 3, in a practical application process, based on the conventional heart beat detection mechanism, a KBox is inserted into a kernel of a guest operation system of each virtual machine, i.e., the first KBox is inserted into the kernel of the guest operation system, to detect a fault occurred in the guest operation system. Specifically, the fault or sub-health problem occurred in the guest operation system may include: an unexpected resetting of the operation system, a memory exhaustion of the operation system, the lockup of the kernel of the operation system, kernel crash of the operation system, a hardware fault of the CPU and a reset of a virtual machine, which will not be limited in the embodiment.

Once the fault or sub-health problem occurs in the guest operation system, the first KBox generates first fault information based on the detected fault and transmits the first fault information to the IMU via an interface between the IMU and the KBox. Specifically, the interface between the IMU and the Kbox is defined in a table 1 hereinafter.

TABLE 1

Definition of an interface

| Field name | Field type | Function |
| --- | --- | --- |
| fault reason | integer | a fault reason value of a guest operation system |
| fault description | string | a fault description of a guest operation system |
| fault occurrence time | integer | system time of the guest operation system when a fault occurs |

The first fault information generated by the first KBox may include a fault reason, a fault description, a fault occurrence time and a virtual machine identifier corresponding to the fault.

After receiving the first fault information, the IMU may identify a virtual machine ID corresponding to a virtual machine in which the first KBox transmitting the first fault information is arranged. The IMU directly transmits to an application HA subsystem first system fault notification information including the first fault information and the identified virtual machine ID. Optionally, the IMU may transmit the first fault information and the virtual machine ID to the infrastructure HA subsystem, and then the infrastructure HA subsystem transmits to the application HA subsystem the first system fault notification information including the first fault information and the virtual machine ID.

The application HA subsystem triggers a service fault processing based on the first system fault notification information, where the service fault processing may include a service switching.

With the technical solution of the embodiment, the first KBox detects a fault occurred in a guest operation system and generates first fault information based on the detected fault, where the first KBox is provided in a virtual machine. The first fault information includes a fault reason, a fault description, a fault occurrence time and a virtual machine identifier corresponding to the fault. The first KBox transmits the first fault information to the IMU. The IMU transmits first system fault notification information to an application HA subsystem corresponding to the virtual machine to trigger a service fault processing of the application HA subsystem, where the first system fault notification information includes the first fault information and the virtual machine identifier corresponding to the first KBox. In this way, a fault or sub-health problem occurred in an operation system may be detected quickly and a service application layer is notified to process the fault in a timely manner to reduce the service loss.

Figure 4:
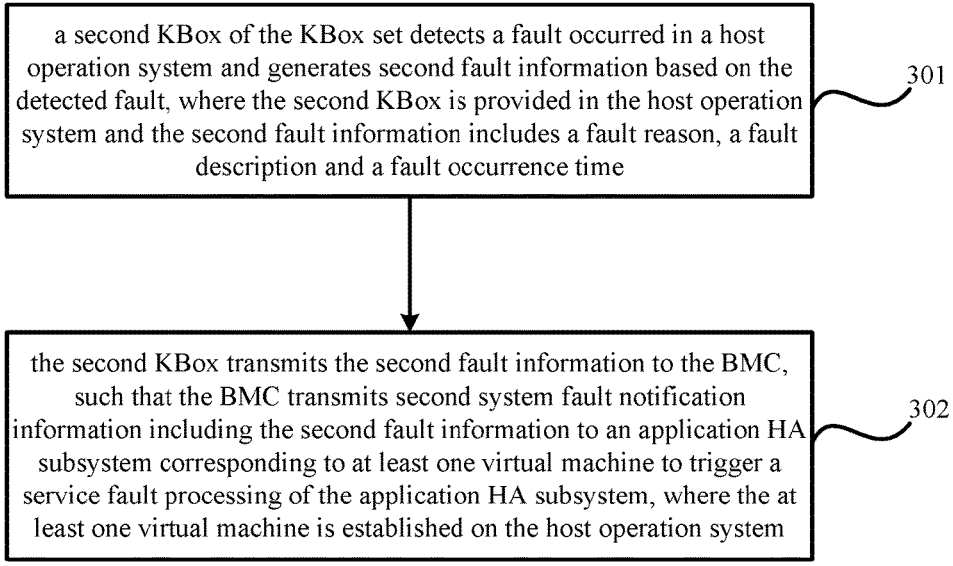
FIG. 4 is a flowchart of a third embodiment of a method for quickly detecting a fault according to the present application.

FIG. 4 is a flowchart of a third embodiment of a method for quickly detecting a fault according to the present application. As shown in FIG. 4, based on the above embodiments, in the method according to the embodiment, the step 101 may include step 301.

In step 301, a second KBox of the KBox set detects a fault occurred in a host operation system and generates second fault information based on the detected fault, where the second KBox is provided in the host operation system and the second fault information includes a fault reason, a fault description and a fault occurrence time.

In the embodiment, the management unit of the infrastructure layer is a board management controller (BMC) implemented in hardware. Accordingly, the step 102 may include step 302.

In step 302, the second KBox transmits the second fault information to the BMC, such that the BMC transmits second system fault notification information including the second fault information to an application HA subsystem corresponding to at least one virtual machine, to trigger a service fault processing of the application HA subsystem, where the at least one virtual machine is established on the host operation system.

Figure 5:
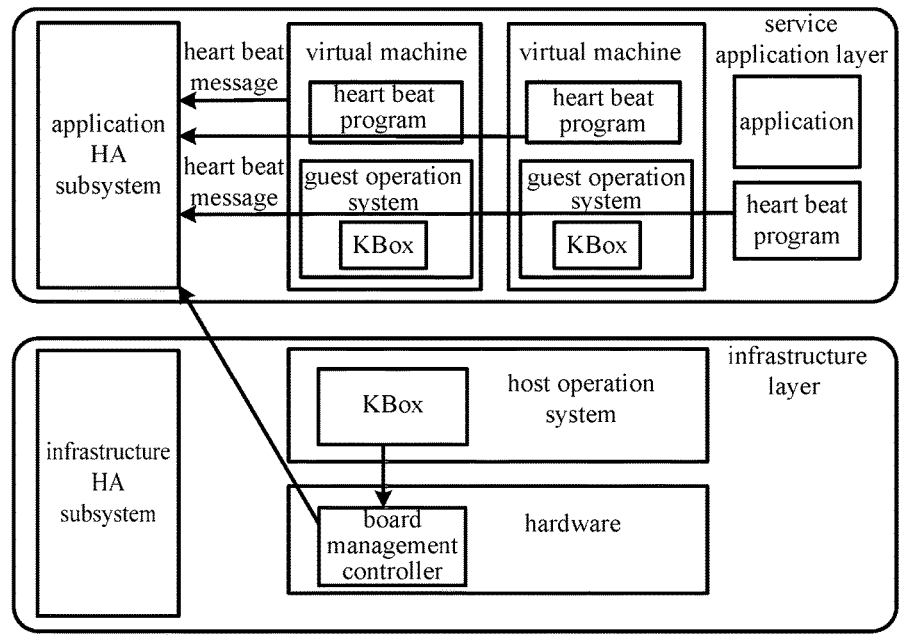
FIG. 5 is a schematic diagram of an application of the third embodiment of the method for quickly detecting the fault according to the present application.

Referring to FIG. 5, in a practical application process, based on the above embodiments and the conventional heart beat detecting mechanism, besides inserting the first KBox into a kernel of the guest operation system of each virtual machine, a KBox may be inserted into a kernel of a host operation system in the embodiment, i.e., a second KBox is inserted into the kernel of the host operation system. The second KBox detects a fault occurred in the host operation system and generates second fault information based on the detected fault. Specifically, the fault or sub-health problem occurred in the host operation system may include: an unexpected reset of the operation system, a memory exhaustion of the operation system, a lockup of the kernel of the operation system, kernel crash of the operation system, a hardware fault of the CPU and a reset of a virtual machine, which will not be limited in the embodiment.

Once a fault or sub-health problem occurs in the host operation system, the second KBox generates second fault information based on the detected fault and transmits the second fault information to the BMC. The second fault information may include a fault reason, a fault description and a fault occurrence time.

After receiving the second fault information, the BMC transmits second system fault notification information including the second fault information to the application HA subsystem. Optionally, the BMC may transmit the second fault information to the infrastructure HA subsystem, and then the infrastructure HA subsystem transmits the second system fault notification information including the second fault information to the application HA subsystem.

The application HA subsystem triggers a service fault processing based on the second system fault notification information, where the service fault processing may include a service switching.

With the technical solution of the embodiment, the second KBox detects a fault occurred in a host operation system and generates second fault information based on the detected fault, where the second KBox is provided in the host operation system. The second fault information includes a fault reason, a fault description and a fault occurrence time. The second KBox transmits the second fault information to the BMC, such that the BMC transmits second system fault notification information including the second fault information to an application HA subsystem corresponding to at least one virtual machine, to trigger a service fault processing of the application HA subsystem. The at least one virtual machines is established on the host operation system. In this way, the fault or sub-health problem occurred in the operation system may be quickly detected and a service application layer is notified to process the fault in a timely manner to reduce the service loss.

Figure 6:
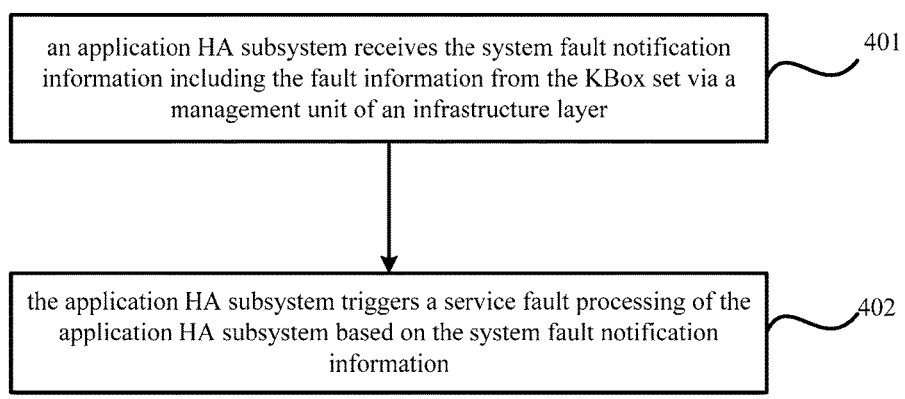
FIG. 6 is a flowchart of a fourth embodiment of a method for quickly detecting a fault according to the present application.

FIG. 6 is a flowchart of a fourth embodiment of a method for quickly detecting a fault according to the application. As shown in FIG. 4, the method according to the embodiment of the present application may include the follows.

In step 401, an application HA subsystem receives system fault notification information including fault information from a KBox set via a management unit of an infrastructure layer.

In a possible implementation, the management unit may be an IMU provided in a host operation system, and the step 401 may include: receiving, by the application HA subsystem, first system fault notification information from the IMU. The first system fault notification information includes the first fault information and a virtual machine identifier corresponding to a first KBox of the KBox set. The first KBox is provided in a virtual machine, and the first fault information includes a fault reason, a fault description, a fault occurrence time and a virtual machine identifier corresponding to the fault.

In another possible implementation, the management unit is a BMC implemented in hardware, and the step 401 may include: receiving, by the application HA subsystem, second system fault notification information from a second KBox of the KBox set via the BMC. The second system fault notification information includes second fault information. The second KBox is provided in the host operation system, and the second fault information includes a fault reason, a fault description and a fault occurrence time.

In step 402, the application HA subsystem triggers a service fault processing of the application HA subsystem based on the system fault notification information.

In a possible implementation, the management unit is an IMU provided in a host operation system, and the step 402 may include: triggering, by the application HA subsystem, a service fault processing of the application HA subsystem based on the first system fault notification information.

In a possible implementation, the management unit is a BMC implemented in hardware, and the step 402 may include: triggering, by the application HA subsystem, a service fault processing of the application HA subsystem based on the second system fault notification information.

It should be noted that, in some possible implementations, the application HA subsystem may also receive from the infrastructure HA subsystem the system fault notification information including the fault information, where the infrastructure HA subsystem transmits the system fault notification information after the fault information transmitted by the KBox set via the management unit of the infrastructure layer.

With the technical solution of the embodiment, the application HA subsystem receives the system fault notification information including the fault information from the KBox set via the management unit of the infrastructure layer, and the application HA subsystem triggers a service fault processing of the application HA subsystem based on the system fault notification information. In this way, a fault or sub-health problem occurred in the operation system may be quickly detected and a service application layer is notified to process the fault in a timely manner to reduce the service loss.

Figure 7:
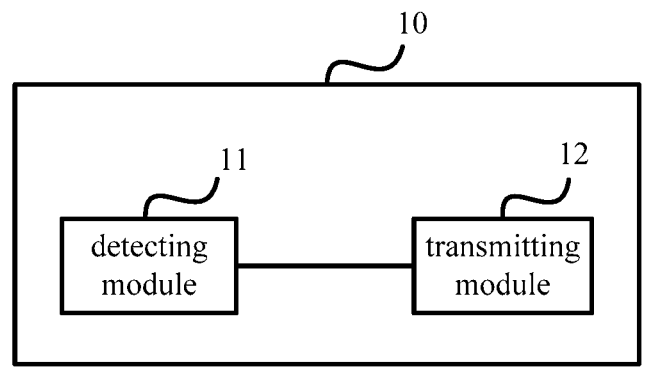
FIG. 7 is a schematic structural diagram of a first embodiment of a device for quickly detecting a fault according to the present application.

FIG. 7 is a schematic structural diagram of a first embodiment of a device for quickly detecting a fault according to the present application. As shown in FIG. 7, the device 10 for quickly detecting the fault according to the embodiment may include a detecting module 11 and a transmitting module 12.

The detecting module 11 is configured to detect a fault occurred in an operation system and generate fault information based on the detected fault by a KBox set.

The transmitting module 12 is configured to transmit system fault notification information including the fault information to an application HA subsystem by the KBox set via a management unit of an infrastructure layer, to trigger a service fault processing of the application HA subsystem.

It should be noted that, the detecting module 11 may further be configured to:

determine, by the KBox set, an unexpected resetting of the operation system based on an execution flow detected by a probe used for a resetting process of the operation system, in a process of detecting the unexpected resetting of the operation system;

determine, by the KBox set, that a memory exhaustion of the operation system in a case that a probe used for a memory resource distributing process of the operation system detects that a memory of the operation system is less than or equal to a preset threshold or the probe detects that a memory of the operation system is less than or equal to a preset threshold in a preset period, in a process of detecting the memory exhaustion of the operation system;

determine, by the KBox, that the kernel of the operation system is locked up in a case that a probe arranged at a central processing unit CPU and used for detecting an operation state detects that the CPU is in a deadlock state, in a process of detecting the lockup of the kernel of the operation system;

determine, by the KBox set, the kernel crash of the operation system based on an execution flow detected by a probe used for a kernel crash processing process of the operation system, in a process of detecting the kernel crash of the operation system;

determine, by the KBox set, the fault of the CPU based on an interruption and fault reason transmitted by a probe arranged in the operation system and used for detecting a hardware fault interruption of the CPU, in a process of detecting a hardware fault of the CPU; and determine, by the KBox set, that the virtual machine is to be reset in a case that the KBox set detects a reset interruption of the virtual machine transmitted on the infrastructure layer, in a process of detecting a resetting of a virtual machine.

In a possible implementation, the detecting module 11 may be configured to detect, by a first KBox of the KBox set, a fault occurred in a guest operation system and generate fault information based on the detected fault, where the first KBox is provided in a virtual machine and the fault information includes a virtual machine identifier corresponding to the fault.

Accordingly, the management unit of the infrastructure layer is an IMU provided in a host operation system of the infrastructure layer. In this case, the transmitting module 12 may be configured to transmit, by the first KBox, the first fault information to the IMU, such that the IMU transmits first system fault notification information to an application HA subsystem corresponding to the virtual machine, to trigger the service fault processing of the application HA subsystem, where the first system fault notification information includes the first fault information and a virtual machine identifier corresponding to the first KBox.

In another possible implementation, the detecting module 11 may be configured to detect, by a second KBox of the KBox set, a fault occurred in a host operation system and generate fault information based on the detected fault, where the second KBox is provided in the host operation system.

Accordingly, the management unit of the infrastructure layer is a BMC implemented in hardware. In this case, the transmitting module 12 may be configured to transmit the second fault information to the BMC by the second KBox, such that the BMC transmits second system fault notification information including the second fault information to an application HA subsystem corresponding to at least one virtual machine, to trigger the service fault processing of the application HA subsystem, where the at least one virtual machine is established on the host operation system.

In some possible implementations, the transmitting module 12 may be further configured to transmit the fault information to an infrastructure HA subsystem by the KBox set via the management unit of the infrastructure layer, such that the infrastructure HA subsystem transmits the system fault notification information including the fault information to the application HA subsystem.

The device for quickly detecting the fault according to the embodiment may be used to perform the technical solutions of the above method embodiments, and the implementation principles and technical effects thereof are similar to those of the method embodiments, which will not be described herein.

Figure 8:
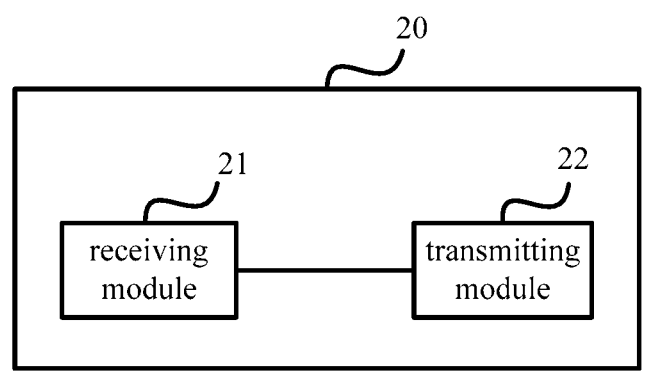
FIG. 8 is a schematic structural diagram of a second embodiment of a device for quickly detecting a fault according to the present application.

FIG. 8 is a schematic structural diagram of a second embodiment of a device for quickly detecting a fault according to the present application. As shown in FIG. 8, the device 20 for quickly detecting the fault according to the embodiment may include a receiving module 21 and a transmitting module 22.

The receiving module 21 is configured to receive system fault notification information, where the system fault notification includes fault information transmitted from a Kernel Black Box KBox set via a management unit of an infrastructure layer.

The transmitting module 22 is configured to trigger a service fault processing of an application HA subsystem based on the system fault notification information.

In a possible implementation, the management unit may be an infrastructure management unit IMU of a host operation system; and accordingly, the receiving module 21 may be further configured to receive first system fault notification information from the IMU, where the first system fault notification information includes the first fault information and a virtual machine identifier corresponding to a first KBox of the KBox set, where the first KBox is provided in a virtual machine, and the first fault information includes a fault reason, a fault description, a fault occurrence time and a virtual machine identifier corresponding to the fault. The transmitting module 22 may be configured to trigger the service fault processing of the application HA subsystem based on the first system fault notification information.

In another possible implementation, the management unit may be a board management controller BMC implemented in hardware; and accordingly, the receiving module 21 may be configured to receive second system fault notification information including second fault information from a second KBox of the KBox set via the BMC, where the second KBox is provided in the host operation system and the second fault information includes a fault reason, a fault description and a fault occurrence time. The transmitting module 22 may be further configured to trigger the service fault processing of the application HA subsystem based on the second system fault notification information.

In some possible implementations, the receiving module 21 may be further configured to receive the system fault notification information including the fault information from the infrastructure HA subsystem, where the infrastructure HA subsystem transmits the system fault notification information after receiving the fault information from the KBox set via the management unit of the infrastructure layer.

The device for quickly detecting the fault according to the embodiment may be used to perform the technical solutions of the above method embodiments, and the implementation principles and technical effects thereof are similar to those of the method embodiments, which will not be described herein.

It should be understood that the device and method disclosed according to the embodiments of the present application may be implemented in other ways. For example, the device embodiments described above are only schematic; the units are divided only based on a logical function, which may be divided in other ways practically; and multiple units or components may be combined or integrated into another system, some features may be ignored or not implemented. In another aspect, the coupling, direct coupling or communication connection displayed or discussed may be indirect coupling or communication connection between devices or units via some interfaces, and the coupling, direct coupling or communication connection may be electrical, mechanic or implemented in other forms.

The unit illustrated as a separated component may or may not be separated physically, and the component displayed as unit may be a physical unit or not, i.e., the component may be located on one position or may be distributed on multiple network units. A part of or all of the units may be selected as needed to achieve objects of the solution of the embodiment.

In addition, the functional units according to the embodiments of the present application may be integrated into one processing unit, or may be units physically independently. Alternatively, two or more units may be integrated into one unit. The integrated units above may be implemented by hardware or hardware in combination with a soft function unit.

The integrated units implemented by the soft function unit may be stored in a computer readable storage medium. The software function unit above is stored in a storage medium and includes several instructions for causing a computer device (which may be a personal computer, a server or a network device or the like) or a processor to perform a part of steps of the methods according to the embodiments of the present application. The above storage medium includes mediums for storing program codes, for example a USB flash disk, a mobile hard disk, a read-only memory (ROM), a random access memory (RAM), a magnetic disc or an optical disk.

Those skilled in the art should understand that the dividing of the functional modules above is taken as an example for convenience and conciseness of the description. In a practical application, the above functions may be distributed to different functional modules as needed, i.e., dividing the internal structure of the device into different functional modules, so as to achieve all or a part of the functions described above. The specific operation process of the device may be referred to a corresponding process in the method embodiments, which is not described here.

Finally, it should be noted that, the above embodiments are only used to describe the technical solutions of the preset application and are not intended to limit the preset application. Although the present application has been illustrated in detail with reference to the embodiments above, those skilled in the art should appreciate that the technical solutions described in the above embodiments may be changed or a part or all of the technical solutions may be substituted equivalently. Further, the changes or substitutions are intended to include the scope of the technical solutions of the embodiments of the present application.

What is claimed is:

1. A method for detecting a fault, comprising:
   detecting, by a processor, that a fault occurred in an operating system of a virtual machine;
   generating, by the processor, fault information based on detecting the fault; and
   transmitting, by the processor, system fault notification information including the fault information to an application high availability (HA) subsystem via a management unit of an infrastructure layer, to trigger a service fault processing of the application HA subsystem, wherein the management unit is an infrastructure management unit (IMU) provided in a host operating system;
   wherein the detecting, by the processor, that the fault occurred comprises:
      detecting, by the processor, that the fault occurred in a guest operating system;
   wherein the generating, by the processor, the fault information based on detecting the fault comprises:
      generating, by the processor, first fault information based on detecting the fault, wherein the first fault information includes a fault reason, a fault description, a fault occurrence time, and a virtual machine identifier corresponding to the fault, and
   wherein the transmitting, by the processor, the system fault notification information comprises:
      transmitting, by the processor, the first fault information to the IMU, wherein the IMU transmits first system fault notification information to an application HA subsystem corresponding to the virtual machine, to trigger the service fault processing of the application HA subsystem, wherein the first system fault notification information includes the first fault information and the virtual machine identifier corresponding to the virtual machine.

2. The method according to claim 1, wherein the detecting, by the processor, that the fault occurred comprises:
   determining, by the processor, an unexpected resetting of the operating system based on an execution flow detected by a probe used for a resetting process of the operating system, in a process of detecting the unexpected resetting of the operating system;
   determining, by the set processor, a memory exhaustion of the operating system in a case that a probe used for a memory resource distributing process of the operating system detects that a memory of the operating system is less than or equal to a preset threshold or the probe detects that the memory of the operating system is less than or equal to a preset threshold in a preset period, in a process of detecting the memory exhaustion of the operating system;
   determining, by the processor, that the kernel of the operating system is locked up in a case that a probe, arranged at a central processing unit (CPU) and used for detecting an operation state, detects that the CPU is in a deadlock state, in a process of detecting the lockup of the kernel of the operating system;
   determining, by the processor, a kernel crash of the operating system based on an execution flow detected by a probe used for a kernel crash processing process of the operating system, in a process of detecting the kernel crash of the operating system;
   determining, by the processor, a fault of the CPU based on an interruption and fault reason transmitted by a probe which is arranged in the operating system and used for detecting a hardware fault interruption of the CPU, in a process of detecting a hardware fault of the CPU; and
   determining, by the processor, that a virtual machine is to be reset in a case that the processor detects a reset interruption of the virtual machine transmitted on the infrastructure layer, in a process of detecting a resetting of the virtual machine.

3. A method for detecting a fault of a virtual machine, comprising:
   receiving, by an application high availability (HA) subsystem, system fault notification information including fault information from a processor via a management unit of an infrastructure layer, wherein the management unit comprises an infrastructure management unit (IMU) provided in a host operating system; and
   triggering, by the application HA subsystem, a service fault processing of the application HA subsystem based on the system fault notification information,
   wherein the receiving, by the application HA subsystem, the system fault notification comprises:
      receiving, by the application HA subsystem, first system fault notification information from the IMU, wherein the first system fault notification information includes first fault information and a virtual machine identifier corresponding to the virtual machine, wherein the first fault information includes a fault reason, a fault description, a fault occurrence time, and a virtual machine identifier corresponding to the fault; and
   the triggering, by the application HA subsystem, the service fault processing of the application HA subsystem based on the system fault notification information comprises:
      triggering, by the application HA subsystem, the service fault processing of the application HA subsystem based on the first system fault notification information.

4. A non-transitory computer readable storage medium storing program codes that, when executed, cause a device to detect a fault of a virtual machine, by performing the steps of:
   detect, by a processor, that a fault occurred in an operating system of the virtual machine and generate fault information based on the fault detected by the processor, wherein detecting the fault occurred comprises: detecting, by the processor, that a fault occurred in a guest operating system;
   generate, by the processor, first fault information based on detecting the fault, wherein the first fault information includes a fault reason, a fault description, a fault occurrence time, and a virtual machine identifier corresponding to the fault; and transmit, by the processor, system fault notification information including the fault information to an application high availability (HA) subsystem via a management unit of an infrastructure layer, to trigger a service fault processing of the application HA subsystem, wherein the management unit is an infrastructure management unit (IMU) provided in a host operating system, wherein transmitting the system fault notification information comprises:
  transmitting, by the processor, the first fault information to the IMU, wherein the IMU transmits first system fault notification information to an application HA subsystem corresponding to the virtual machine, to trigger the service fault processing of the application HA subsystem, wherein the first system fault notification information includes the first fault information and a virtual machine identifier corresponding to the virtual machine.

5. The computer readable storage medium according to claim 4, wherein the processor performs the program codes to:
  determine, by the processor, an unexpected resetting of the operating system based on an execution flow detected by a probe used for a resetting process of the operating system, in a process of detecting the unexpected resetting of the operating system;
  determine, by the processor, a memory exhaustion of the operating system in a case that a probe used for a memory resource distributing process of the operating system detects that a memory of the operating system is less than or equal to a preset threshold or the probe detects that a memory of the operating system is less than or equal to a preset threshold in a preset period, in a process of detecting the memory exhaustion of the operating system;
  determine, by the processor, that a kernel of the operating system is locked up in a case that a probe, arranged at a central processing unit (CPU) and used for detecting an operating state, detects that the CPU is in a deadlock state, in a process of detecting the lockup of the kernel of the operating system;
  determine, by the processor, a kernel crash of the operating system based on an execution flow detected by a probe used for a kernel crash processing process of the operating system, in a process of detecting the kernel crash of the operating system;
  determine, by the processor, a fault of the CPU based on an interruption and fault reason transmitted by a probe which is arranged in the operating system and used for detecting a hardware fault interruption of the CPU, in a process of detecting a hardware fault of the CPU; and
  determine, by the processor, that the virtual machine is to be reset in a case that the processor detects a reset interruption of the virtual machine transmitted on the infrastructure layer, in a process of detecting a resetting of a virtual machine.

6. A non-transitory computer readable storage medium storing program codes that, when executed, cause a device to detect a fault of a virtual machine, by performing the steps of:
  receive system fault notification information including fault information from a processor via a management unit of an infrastructure layer, wherein the management unit comprises an infrastructure management unit (IMU) provided in a host operating system;
  receive first system fault notification information from the IMU, wherein the first system fault notification information includes first fault information and a virtual machine identifier corresponding to virtual machine, the first fault information includes a fault reason, a fault description, a fault occurrence time, and a virtual machine identifier corresponding to the fault; and
  trigger a service fault processing of an application high availability (HA) subsystem based on the first system fault notification information.

* * * * *